United States Patent
Blanc et al.

(10) Patent No.: US 11,364,994 B2
(45) Date of Patent: *Jun. 21, 2022

(54) FLIGHT CONTROL METHOD FOR ROTORCRAFT, AND A ROTORCRAFT

(71) Applicant: AIRBUS HELICOPTERS, Marignane (FR)

(72) Inventors: Frederic Blanc, Pelissanne (FR); Serge Mezan, Sausset les Pins (FR)

(73) Assignee: AIRBUS HELICOPTERS, Marignane (FR)

( * ) Notice: Subject to any disclaimer, the term of this patent is extended or adjusted under 35 U.S.C. 154(b) by 0 days.

This patent is subject to a terminal disclaimer.

(21) Appl. No.: 17/028,235

(22) Filed: Sep. 22, 2020

(65) Prior Publication Data

US 2021/0001975 A1   Jan. 7, 2021

Related U.S. Application Data

(63) Continuation of application No. 15/831,727, filed on Dec. 5, 2017, now Pat. No. 10,814,961.

(30) Foreign Application Priority Data

Dec. 16, 2016   (FR) ..................... 1601793

(51) Int. Cl.
*B64C 13/18*   (2006.01)
*B64C 13/50*   (2006.01)
(Continued)

(52) U.S. Cl.
CPC .......... *B64C 13/18* (2013.01); *B64C 13/0421* (2018.01); *B64C 13/506* (2018.01); *B64C 27/57* (2013.01); *G05D 1/0858* (2013.01)

(58) Field of Classification Search
CPC ....... B64C 13/18; B64C 27/57; B64C 13/506; B64C 13/0421; B64C 27/82; G05D 1/0858
See application file for complete search history.

(56) References Cited

U.S. PATENT DOCUMENTS 3,920,966 A   11/1975   Knemeyer et al.
4,463,605 A   8/1984   McDowell et al.
(Continued)

FOREIGN PATENT DOCUMENTS

FR   2771071 A1   5/1999

OTHER PUBLICATIONS

French Search Report for French Application No. FR 1601793, Completed by the French Patent Office, dated Oct. 9, 2017, 10 pages.

(Continued)

*Primary Examiner* — Marthe Y Marc-Coleman
(74) *Attorney, Agent, or Firm* — Brooks Kushman P.C.

(57) ABSTRACT

A method of controlling a path of a rotorcraft. The method comprises a step of generating a first path setpoint and a step of automatically generating a first autopilot command from the first path setpoint. The method comprises a step of generating a first pilot setpoint during which a movement of a control member is transformed into a first pilot setpoint, the first pilot setpoint and the first flight parameter being homogenous in that they are expressed in the same measurement unit. The method includes a step of generating a first human pilot command from the first pilot setpoint followed by a step of generating a path command by combining the first autopilot command and the human pilot command.

17 Claims, 5 Drawing Sheets

(51) Int. Cl.
*B64C 27/57* (2006.01)
*G05D 1/08* (2006.01)
*B64C 13/04* (2006.01)

(56) References Cited

U.S. PATENT DOCUMENTS

| | | | |
|---|---|---|---|
| 4,527,242 | A | 7/1985 | McElreath et al. |
| 5,489,830 | A * | 2/1996 | Fernandez .............. B64C 13/18 |
| | | | 318/584 |
| 5,510,991 | A * | 4/1996 | Pierson ................ G05D 1/0061 |
| | | | 244/178 |
| 6,772,054 | B1 | 8/2004 | Achache |
| 9,308,985 | B2 | 4/2016 | Kubik et al. |

OTHER PUBLICATIONS

Itoh Eri et al., "Evaluation on novel architecture for harmonizing manual and automatic flight controls under atmospheric turbulence", Aerospace Science and Technology, Elsevier Masson, FR, vol. 24, No. 1, Nov. 25, 2011, pp. 241-254, XP028983870, 14 pages.
Notice of Preliminary Rejection for Korean Application No. 10-2017-0173253, dated Mar. 27, 2019, 3 Pages.

* cited by examiner

FLIGHT CONTROL METHOD FOR ROTORCRAFT, AND A ROTORCRAFT

CROSS-REFERENCE TO RELATED APPLICATIONS

This application is a continuation of U.S. application Ser. No. 15/831,727, filed Dec. 5, 2017, which claims priority to French patent application No. FR 1601793 filed on Dec. 16, 2016, the disclosures of which are incorporated in their entirety by reference herein.

BACKGROUND OF THE INVENTION

(1) Field of the Invention

The present invention relates to a flight control method for rotorcraft.

The present invention lies in particular in the field of rotorcraft, and more particularly it relates to partially automatic flight control systems that influence the flight behavior of the rotorcraft.

(2) Description of Related Art

A rotorcraft presents at least one main rotor that contributes at least in part to providing the aircraft with lift.

A rotorcraft may then have control members moved by a human pilot in order to control the pitch of the blades of the rotor(s) via control linkages. The concept of "manual" should be contrasted with the concept of "automatic" without prejudice to the means used by a human to control the rotorcraft: pedals, stick, joystick, lever, touch control, or voice control in particular.

In a conventional helicopter having a main rotor and a yaw movement control rotor, a "collective pitch" lever enables the pilot to control collectively the pitch of the blades of the main rotor. A "cyclic" stick enables a pilot to control cyclically the pitch of the blades of the main rotor, and pedals enable a pilot to control collectively the pitch of the blades of the yaw movement control rotor.

In addition, the rotorcraft may include an autopilot. The autopilot generates automatic command orders.

In a first embodiment of a rotorcraft, the control members are engaged with mechanical command transmission systems connected to the blades of the rotors. Those mechanical command transmission systems enable the pilot of a rotorcraft to move the blades mechanically by using the control members, either directly or else via servo-controls.

Where appropriate, an autopilot can then control jacks that are arranged on the mechanical command transmission systems. Under such circumstances, the jacks may be moved by the control members, but they are controlled solely by the autopilot. Only the autopilot can cause a jack to change state. The term "change state" refers to causing one member of the jack to move relative to another member of the jack. Thus, an autopilot may cause a change of state in the form of the jack being retracted or extended if it is a linear jack, or a rod being turned if it is a rotary jack, . . . .

In a second embodiment of a rotorcraft, the pilot moving the control member generates electrical signals for activating at least one actuator for controlling the blades. Such actuator may for example be mechanically connected to a hydraulic valve of a servo-control.

A calculation unit is interposed for this purpose between the control members and the actuators. The calculation unit can prepare orders that are transmitted to the actuators as a function of signals issued by the control members. Furthermore, the calculation unit may include a module that acts as an autopilot.

Whatever the embodiment, the orders given by an autopilot are of two types.

In basic autopilot modes, the autopilot can generate orders for stabilizing the aircraft, in particular by controlling attitude angles.

In higher autopilot modes, the autopilot can generate orders for holding a path.

By way of illustration, a basic mode may seek to maintain a roll angle of the aircraft equal to zero. In more advanced manner, a higher mode may seek to control the aircraft so that it flies at a given altitude, so that it moves at a setpoint speed, . . . .

When the human pilot does not act on the control members, the orders given by the basic modes of the autopilot seek to hold flight parameters equal to setpoints. In the event of the higher modes of the autopilot being activated, the orders given by the autopilot enable more sophisticated paths to be controlled, e.g. such as automatic approaches.

If the human pilot acts on a manual control member along a given piloting axis (longitudinal, lateral, collective, and/or yaw), the orders given by the autopilot seek to act only on the stability level of the aircraft and on decoupling. If the control members implement relationships for piloting by target, the human pilot may control certain states of the aircraft directly, while the autopilot stabilizes the aircraft. However under all circumstances, all automatic holding aids, and in particular the aids of the higher modes on corresponding axes, are deactivated when the human pilot moves a manual control member. When the human pilot releases this action, the higher modes can once more hold to their setpoints, but only after a delay that is necessary for determining that piloted action has come to an end and for correctly reinitializing the path. During this time lapse, the aircraft remains without any holding to the reference path, and that can lead to drifts relative to the reference.

In certain circumstances of flight in which the pilot cannot assess the outside environment correctly (e.g. when flying in poor visibility), or indeed when the pilot has a very large workload, operating under such logic can be problematic.

For example, when a mission requires hovering flight to be performed at night over a ship, the pilot may well not have sufficient visual capability to hold the hovering flight under good conditions of workload and/or safety. The pilot can thus engage an autopilot mode for holding hovering flight. Nevertheless, if the pilot interacts with the autopilot mode for holding hovering flight by making use of a control member, in voluntarily manner if it is desired to correct position, or indeed in involuntarily manner, that interaction suspends the autopilot mode of holding hovering flight and runs the risk of generating drifts in position that could potentially be problematic in the face of obstacles.

Document FR 2 771 071 describes a device for actuating a control member on a rotary wing aircraft. That document describes relationships for piloting by target.

Specifically, a control member instead of generating an order to move a servo-control, instead generates a target. The target is then converted by a servo-control module into an order for moving an actuator in order to hold the target. For example, the movement of a stick is transformed into a speed target, with the servo-control module controlling an actuator in order to hold the speed target.

Certain aircraft may also include a joystick that is operated by an operator, e.g. during winching, in order temporarily to modulate reference ground speeds.

Document U.S. Pat. No. 9,308,985 relates to a system for enabling an aircraft to reach a position while hovering.

In order to enable the aircraft to reach a position while hovering and achieve lateral and longitudinal ground speeds that are zero, the aircraft may apply a predetermined deceleration profile. The pilot can also modulate the deceleration of the aircraft by operating a stick. Under such circumstances, the stick may be moved longitudinally in order to modify the deceleration of the aircraft along a longitudinal axis of the aircraft and laterally in order to modify a deceleration of the aircraft along a lateral axis of the aircraft.

In other words, the pilot can generate orders relating to acceleration along two axes, in order finally to reach a stationary position, i.e. a zero speed.

Also known is Document U.S. Pat. No. 3,920,966.

The document by Itoh Eri et al. "Evaluation on novel architecture for harmonizing manual and automatic flight controls under atmospheric turbulence", Aerospace Science and Technology, Elsevier Masson, FR, Vol. 24, No. 1, Nov. 25, 2011 is also known.

BRIEF SUMMARY OF THE INVENTION

The object of the present invention is to obtain a novel flight control method for rotorcraft, the method providing commands that are partially automated when a path-holding mode is engaged.

The invention thus provides a method of implementing a flight control system for controlling a path of a rotorcraft, the rotorcraft having at least one movable aerodynamic maneuvering member for controlling the movement of the rotorcraft, the rotorcraft having at least one actuator for moving the maneuvering member, the flight control system having a flight control member movable by a human pilot.

On each iteration and for at least a first type of interfacing, the method comprises:

a step of generating a first path setpoint, the first path setpoint representing a value to be reached by a first flight parameter;

a step of automatically generating a first autopilot command from said first path setpoint by applying a first predetermined autopilot mathematical model;

a step of generating a first "pilot setpoint", during which a movement of said control member is transformed by a first piloting-by-target model into the first pilot setpoint, said first pilot setpoint and the first flight parameter being homogenous in that they are expressed in the same measurement unit;

a step of generating a first human pilot command from the first pilot setpoint by applying a first predetermined human piloting mathematical model;

a step of generating a first path command by combining said first autopilot command and said first human pilot command; and a control step for controlling at least one said actuator, during which at least one order is transmitted to at least one actuator, said order being determined by a servo-control module from at least the first path command and at least a current value of said first flight parameter.

In this method, a first path setpoint is issued. For example, the first flight parameter may be the longitudinal ground speed of the aircraft, and the path setpoint may specify that this longitudinal ground speed is to reach 40 knots (kt).

Under such circumstances, an autopilot module automatically generates a first autopilot command in order to reach this target in due course. Such an autopilot module may be in the form of an independent computer or it may form part of a computer, e.g. a segment of code. The autopilot module may be referred to as an autopilot, for short. In the above example, the aircraft need not necessarily reach the first established path setpoint directly. Under such circumstances, during a regulation loop, this first path setpoint is automatically transformed into an intermediate setpoint referred to as a "first autopilot command" by using a predetermined model referred to as a "first autopilot mathematical model".

The term "model" designates any predetermined means capable of performing the required transformation. By way of example, such a model may comprise a database, a curve, at least one mathematical relationship, . . . .

The invention thus lies in the context of automatically guiding a rotorcraft. Nevertheless, and in novel manner, the method enables a pilot to influence the path followed, but without disconnecting the already-engaged automatic guidance mode.

Thus, the pilot may act on a control member, such as a stick, a lever, pedals, a voice control system, a touch control system, or a visual control system, . . . . In the first type of interfacing, this action leads to automatic creation of a first pilot setpoint that is homogeneous with the first path setpoint.

The term "homogenous" means that the variables in question relate to the same physical entity, e.g. a speed of the aircraft along a longitudinal axis. Thus, the pilot setpoint represents a value for offsetting the first flight parameter, seeking to shift the state in which the rotorcraft will be found once the first flight parameter reaches the first path setpoint.

Like the first path setpoint, the first pilot setpoint is transformed automatically into a first human pilot command. The action of the pilot on the control member is thus converted into a piloting target that is prepared so as to be capable of being coupled with the automatic holding of the first flight parameter.

This first human pilot command is not substituted for the first autopilot command, but rather is combined automatically therewith in order to prepare a first hybrid path command. For example, this first path command is the result of summing components of the first autopilot command and corresponding components of the first human pilot command.

The first hybrid path command is then used, e.g. in conventional manner, to generate automatically commands that are transmitted to the actuators as a function of the current state of the rotorcraft. In particular, the first hybrid path command may present various components relating to various parameters, the commands being prepared automatically as a function of the measured current values of the various parameters.

In particular, a servo-control module issues an order seeking to modify the state of an actuator as contrasted with moving it. Possibly, an actuator may comprise a body and an outlet shaft, the servo-control module issuing an order to cause the actuator to change state by moving said outlet shaft relative to the body. For example, the servo-control module controls a linear actuator in order to extend or retract the actuator as a function of the first path command and as a function of the current state of the rotorcraft. In another example, the servo-control module controls a rotary actuator in order to cause the outlet shaft of the actuator to turn.

This method thus makes it possible to provide a guidance system that is at least partially automatic, enabling the action of the pilot on a control member to be superposed on an autopilot acting to hold path parameters. This method thus makes it possible to provide a piloting interface between firstly the relationship for piloting by target as associated with a control member and secondly automatic holding of a path, in particular by the higher modes of the autopilot.

In particular, the piloting target is homogenous with the parameter held by at least one engaged automatic guidance mode. For example, if an engaged higher mode of the autopilot is holding to a lateral ground speed profile Vysol and thus to a ground path along the lateral axis of the aircraft, the relationship for piloting by target enables a pilot to control this same lateral ground speed Vysol directly. The path command generated by the system on the lateral axis of the aircraft is the sum of the first autopilot command generated by the automatic holding of the autopilot plus the first human pilot command generated by a pilot. The pilot can thus alter the lateral ground speed, possibly in proportion to action taken on the control member. A pilot can thus manage a path while conserving the active stage of the autopilot.

When the pilot releases the control member, the autopilot is active immediately since the autopilot has never been suspended, so there is no reinitialization stage.

In another example, while automatically following a vertical speed profile, the relationship for piloting by target can enable the vertical speed to be altered relative to the vertical path that is being controlled automatically.

The invention thus enables a pilot to act on the path of the aircraft without changing the autopilot setpoint. The flight control system can thus enable a pilot to manage the path being held by an autopilot, in particular by changing a flight parameter being held thereby.

This method may also include one or more of the following characteristics.

Thus, said first path setpoint may be set by a human pilot.

The aircraft may include a usual autopilot interface for establishing the value of the first flight path setpoint. For example, such an interface may be in the form of a touch screen, a knob, a button, . . . .

In another aspect, the first autopilot command may comprise at least a first component associated with a second derivative of the first flight parameter, a second component associated with a first derivative of the first flight parameter, and a third component associated with the first flight parameter.

In addition, the first human pilot command may comprise at least a first component associated with a second derivative of the first flight parameter, a second component associated with a first derivative of the first flight parameter, and a third component associated with the first flight parameter.

The first path command may comprise at least a first component combining the first component of the first autopilot command and the first component of the first human pilot command, a second component combining the second component of the first autopilot command and the second component of the first human pilot command; and a third component combining the third component of the first autopilot command and the third component of the first human pilot command.

The order transmitted to at least one actuator may then be determined by the servo-control module on the basis of at least the first path command and at least a current value of said first flight parameter, a current value of the first derivative of the first flight parameter, and a current value of the second derivative of the first flight parameter.

In another aspect, the step of automatically generating an autopilot command may comprise the following steps:

transforming the first path setpoint into an automatic setpoint value for a second derivative of the first flight parameter by applying the first autopilot mathematical model, a first component of the first autopilot command being represented by this automatic setpoint value for a second derivative of the first flight parameter;

establishing an automatic setpoint value for a first derivative of the first flight parameter by integrating said automatic setpoint value for a second derivative of the first flight parameter, a second component of the first autopilot command being represented by this automatic setpoint value for a first derivative of the first flight parameter; and establishing an automatic setpoint value for said first flight parameter by integrating said automatic setpoint value for a first derivative of the first flight parameter, a third component of the first autopilot command being represented by this automatic setpoint value for the first flight parameter.

The first autopilot mathematical model may comprise a profile for varying the first path setpoint.

In another solution, the step of transforming the first path setpoint into an automatic setpoint value for a second derivative of the first flight parameter is performed by applying a second-order lowpass filter.

For example, this transformation step may be performed by applying the following relationship:

$$\ddot{X}coma_n = 2*\delta*\omega 0 * \left[ (Xcons - Xcoma_{n-1}) * \frac{\omega 0}{2*\delta} - \dot{X}coma_{n-1} \right]$$

where "$\ddot{X}coma_n$" represents the value of the automatic setpoint for the second derivative of the first flight parameter at the current computation cycle, "$\delta$" represents the predetermined damping of the filter, "$\omega 0$" represents the predetermined cutoff frequency of the filter, "Xcons" represents the path setpoint, "$Xcoma_{n-1}$" represents the automatic setpoint value for the first flight parameter at the computation cycle preceding the current computation cycle, "$\dot{X}coma_{n-1}$" represents the automatic setpoint value for the first derivative of the first flight parameter at the computation cycle preceding the current computation cycle.

The step of automatically generating a first autopilot command may include a step of bounding the automatic setpoint value for a second derivative of the first flight parameter.

This step seeks to avoid the aircraft moving too violently.

For example, the bounding step may be performed by bounding the following expression:

$$(Xcons - Xcoma_{n-1}) * \frac{\omega 0}{2*\delta}$$

In another aspect, the step of generating a human pilot command may comprise the following steps:

transforming the first pilot setpoint into a human setpoint value for a second derivative of the first flight parameter, a first component of the first human pilot command being represented by this human setpoint value for a second derivative of the first flight parameter;

establishing a human setpoint value for a first derivative of the first flight parameter by integrating said human setpoint value for a second derivative of the first flight parameter, a second component of the first human pilot command being represented by this human setpoint value for a first derivative of the first flight parameter; and establishing a human setpoint value for the first flight parameter by integrating said human setpoint value for a first derivative of the first flight parameter, a third component of the first human pilot command being represented by this human setpoint value for the first flight parameter.

The first mathematical model may comprise a profile for varying the first pilot setpoint.

In another solution, the step of transforming the first pilot setpoint into a human setpoint value for a second derivative of the first flight parameter is performed by applying a second-order lowpass filter.

For example, the step of transforming the piloting setpoint into a second derivative of the first piloting setpoint may be performed by applying the following relationship:

$$\ddot{X}comp_n = \lfloor (Xpil - Xcomp_{n-1})*\omega 0p^2 - 2*\delta p*\omega 0p*\dot{X}comp_{n-1} \rfloor$$

where "$\ddot{X}comp_n$" represents the human setpoint value for the second derivative of the first flight parameter at the current computation cycle, "$\delta p$" represents the predetermined damping of the filter, "$\omega 0p$" represents the predetermined cutoff frequency of the filter, "$Xpil$" represents the first pilot setpoint, "$Xcomp_{n-1}$" represents the human setpoint value for the first flight parameter at the computation cycle preceding the current computation cycle, "$\dot{X}comp_{n-1}$" represents the human setpoint value for the first derivative of the first flight parameter at the computation cycle preceding the current computation cycle.

Furthermore, the method then makes it possible to perform path following on at least two distinct guidance targets.

This second target may be held by applying the above-described first type of interfacing. Nevertheless, the method may provide a second type of interfacing that is different.

Thus, for at least one second type of interfacing, said method comprises:

a step of generating a second path setpoint, the second path setpoint representing a value to be reached by a second flight parameter;

a step of automatically generating a second automatic pilot command from said second path setpoint by applying a second predetermined autopilot mathematical model;

a step of generating a second pilot setpoint during which a movement of said control member is transformed by a second piloting-by-target model into a second pilot setpoint, said second pilot setpoint and a first derivative of the second flight parameter being homogenous in that they are expressed in the same measurement unit;

a step of generating a second human pilot command from the second pilot setpoint by applying a second predetermined human piloting mathematical model;

a step of generating a second path command by combining said second autopilot command and said second human pilot command; and a control step for controlling at least one said actuator during which at least one order is transmitted to at least one actuator, said order being determined by said servo-control module on the basis of at least the second path command and of at least one current value of said second flight parameter.

The second piloting target may be homogenous with the dynamic variation of the second flight parameter held by the autopilot.

For example, the autopilot may hold to a profile for the longitudinal ground speed Vxsol. The relationship for piloting by target may then enable the dynamic variation of the longitudinal ground speed Vxsol to be controlled directly. The path control along the longitudinal axis then comprises a component equal to the sum of the dynamic variation in the speed as generated automatically by the autopilot, plus the dynamic variation generated by the pilot. The pilot thus has the possibility of modifying the path followed, possibly in proportion to the pilot's action on the control member.

In another example, when automatically acquiring a selected heading, the autopilot may hold to a turn rate profile. The relationship for piloting by target can then enable the dynamic variation in the heading to be controlled.

The step of generating a second autopilot command may comprise the same steps as the step of generating the first autopilot command.

In another aspect, the step of generating a human pilot command may comprise the following steps:

transforming the second pilot setpoint into a human setpoint value for a second derivative of the second flight parameter, a first component of the second human pilot command being represented by this human setpoint value for a second derivative of the second flight parameter; and establishing a human setpoint value for a first derivative of the second flight parameter by integrating said human setpoint value for a second derivative of the second flight parameter, a second component of the second human pilot command being represented by this human setpoint value for a first derivative of the second flight parameter.

By way of example, the step of transforming the second pilot setpoint into a human setpoint value for a second derivative of the second flight parameter is performed by applying a first-order lowpass filter.

For example, the step of transforming the second piloting setpoint into a human setpoint value for the second derivative of the second flight parameter is performed by applying the following relationship:

$$\ddot{X}comp_n = \frac{\dot{X}pil - \dot{X}comp_{n-1}}{\tau p}$$

where "$\ddot{X}comp_n$" represents the human setpoint value for the second derivative of the second flight parameter at the current computation cycle, "$\tau p$" represents a predetermined time constant of the filter, "$\dot{X}pil$" represents the second pilot setpoint, "$\dot{X}comp_{1-1}$" represents the human setpoint value for the first derivative of the second flight parameter at the computation cycle preceding the current computation cycle.

Optionally, the rotorcraft may include a stick movable in a "longitudinal" direction from front to rear and from rear to front, the stick being movable in a "transverse" direction from left to right and from right to left, and said first pilot setpoint may be established by moving said stick along one of said directions, and said second pilot setpoint is established by moving said stick along the direction that is not associated with the first pilot setpoint.

In another aspect, one piloting target may be homogenous with the dynamic variation of a flight parameter, and another target may be homogenous with the flight parameter.

In an example, a target of holding to a lateral ground speed and a target of holding to a longitudinal ground speed may be held by the autopilot using the method of the invention. Under such circumstances, a pilot can operate a control member in the longitudinal direction in order to optimize the path followed by acting on the longitudinal acceleration of the aircraft while applying the second type of interfacing, and in a lateral direction to optimize the path followed by acting on the lateral ground speed of the aircraft while applying the first type of interfacing.

In addition to a method, the invention provides a rotorcraft applying the method.

The rotorcraft is provided with a flight control system for controlling a path of the rotorcraft, the rotorcraft having at least one aerodynamic maneuvering member that is movable to control a movement of the rotorcraft, the rotorcraft including at least one actuator for moving the maneuvering member, the flight control system including a flight control member movable by a human pilot.

The rotorcraft thus performs the above-described method, said rotorcraft comprising:

a setpoint generator performing the step of generating a first path setpoint;

a command generator for generating automatic path-holding modes that implements the step of automatically generating a first autopilot command;

a human pilot command generator that implements the step of generating a first pilot setpoint and the step of generating a first human pilot command;

a path command generator connected to the command generator for generating automatic path-holding modes and to the human pilot command generator, the path command generator implementing the step of generating a path command; and a servo-control module connected to the path command generator and to said actuator and to at least one sensor measuring data relating to a path to be followed, said at least one sensor comprising a sensor measuring a current value of said first flight parameter, said servo-control module implementing the command step.

BRIEF DESCRIPTION OF THE DRAWINGS

The invention and its advantages appear in greater detail from the context of the following description of examples given by way of illustration and with reference to the accompanying figures, in which.

DETAILED DESCRIPTION OF THE INVENTION

Elements present in more than one of the figures are given the same references in each of them.

Figure 1:
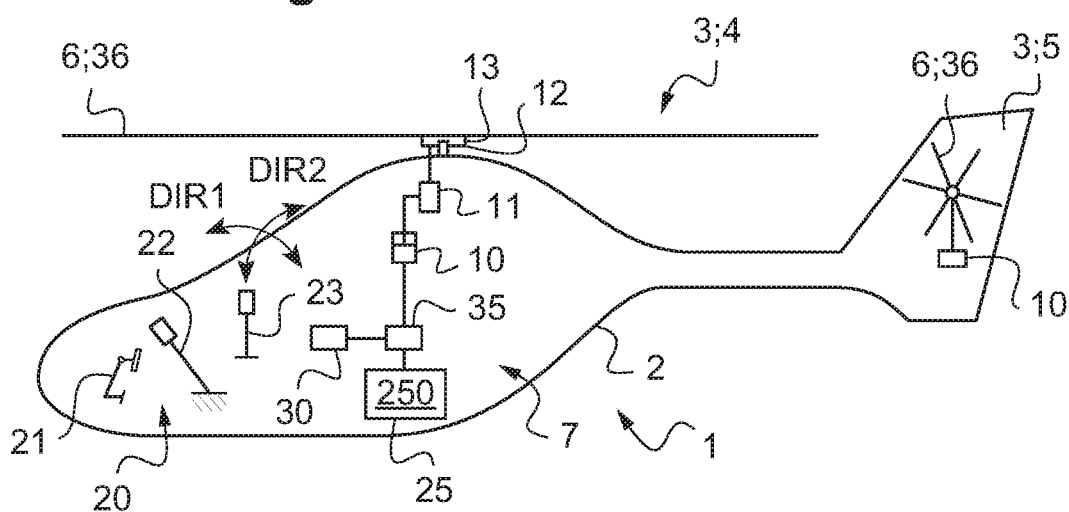
FIG. 1 is a diagram showing a rotorcraft of the invention.

FIG. 1 shows a rotorcraft 1 of the invention. The rotorcraft comprises a fuselage 2 and at least one rotor 3 having a plurality of blades 6. For example, the fuselage 2 carries a main rotor 4 that contributes to providing the rotorcraft with lift and propulsion, together with a tail rotor 5 that contributes to controlling the yaw movement of the rotorcraft.

The blades 6 constitute maneuvering members 36 that are movable so as to control the movement of the rotorcraft in three-dimensional space. For this purpose, the rotorcraft has actuators 10 suitable for moving the maneuvering members 36, and in particular for modifying the pitch of the blades. By way of example, such an actuator 10 is connected to a hydraulic valve of a servo-control, the servo-control controlling the pitch of the blades in conventional manner.

By way of illustration, the main rotor 4 may include a set of swashplates 12 connected to each blade of the main rotor 4 by respective pitch rods 13. Furthermore, at least three servo-controls 11 are hinged to the set of swashplates, each servo-control 11 being controlled by one or more actuators 10.

By way of example, such an actuator may be in the form of an electric jack controlled by a signal.

To enable a pilot to pilot the rotorcraft 1, the rotorcraft 1 has a flight control system 7.

The flight control system 7 has flight control members 20. For conventional modes of flight, these flight control members may include by way of example: a lever 22 controlling the pitch of the blades of the main rotor collectively; a stick 23 controlling the pitch of the blades of the main rotor cyclically; and pedals 21 controlling the pitch of the blades of the tail rotor. The stick 23 is movable in particular in a direction referred to as the "longitudinal" direction DIR1 from front to rear, and also in a direction referred to as the "transverse" direction DIR2 from left to right, where the terms left, right, front, and rear should be considered from the point of view of the pilot moving the stick.

Furthermore, the flight control system 7 includes a processor unit 35 suitable for controlling the actuators 10.

On a mechanically controlled rotorcraft, the control members serve to move mechanical systems incorporating said actuators, the processor unit 35 controlling the actuators 10. On an electrically controlled rotorcraft, the control members may serve to generate signals that are transmitted to the processor unit 35, with the processor unit 35 controlling the actuators 10.

By way of example, the processor unit 35 may comprise at least one processor, at least one integrated circuit, at least one programmable system, at least one logic circuit, these examples not limiting the scope to be given to the term "processor unit".

The processor unit 35 is also connected by wired or wireless connections to a measurement system 30. The measurement system 30 has at least one sensor measuring the value of a flight parameter. The term "sensor" should be interpreted broadly, which term may cover a sensor as such or indeed a measurement device such as an inertial unit, for example. The measurement system may include at least one speed sensor measuring the longitudinal and lateral components of the speed of the aircraft, together with values for the first and second derivatives of these components. The measurement system may comprise equipment that is usually present on board an aircraft, and in particular a rotorcraft.

Furthermore, the processor unit 35 may be connected to a setpoint generator 25 that generates autopilot setpoints. The setpoint generator 25 may be in the form of an interface 250 operable by a human pilot in order to set said setpoints.

Under such circumstances, a pilot can act on the movement of the rotorcraft by operating the control members 20 and/or by engaging autopilot modes via the interface 250.

In the invention, the processor unit 35 can prepare the orders that are transmitted to the actuators 10, in particular for the purpose of modifying the state of the actuator. These orders are prepared from piloting relationships incorporated in the processor unit 35, from commands generated by the pilot's control members 20, from setpoints coming from the interface 250 with automatic path-holding modes on the various piloting axes including higher autopilot modes, and from measurements coming from the measurement system 30 of the rotorcraft.

On a rotorcraft, the various piloting axes include a longitudinal axis for piloting pitching and a transverse axis for piloting roll, which are controlled by acting on the cyclic pitch of the blades of the main rotor, a yaw axis for piloting yaw, which is controlled by acting on the collective pitch of the blades of the tail rotor, and a vertical axis for vertical piloting, which is controlled by acting on the collective pitch of the blades of the main rotor.

Figure 2:
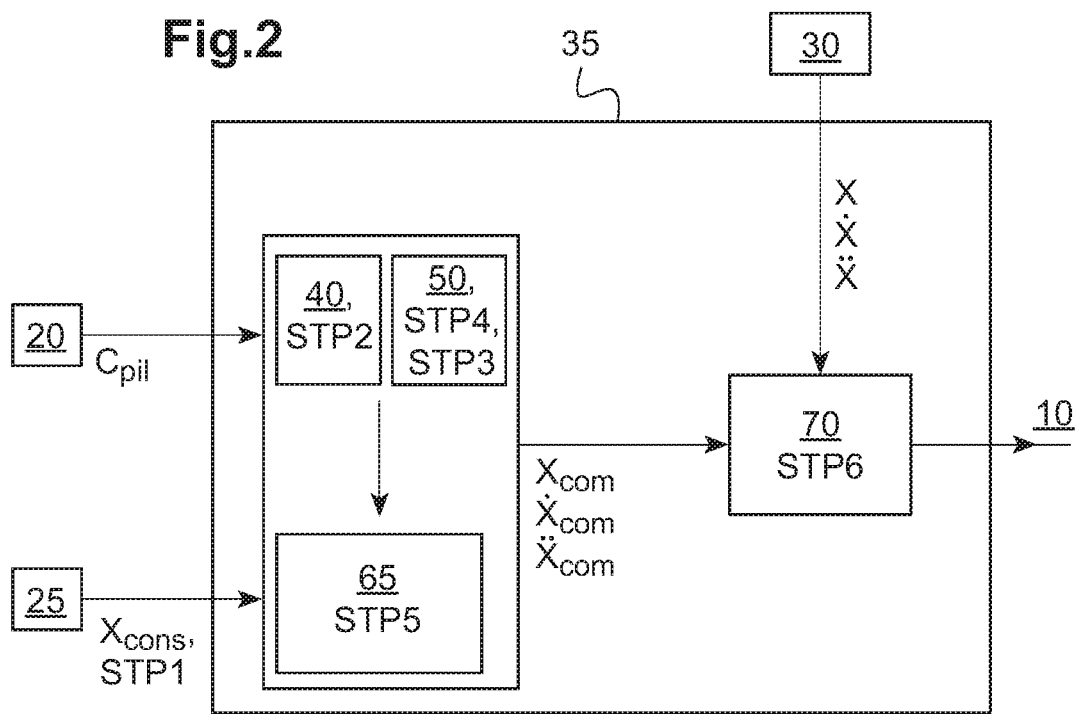
FIG. 2 is a diagram showing a processor unit implementing the method of the invention.

With reference to FIG. 2, the processor unit 35 may be subdivided into a plurality of functional blocks. Each block may be embodied by an entire computer, or it may represent a portion of a computer such as a portion of stored code or of a logic circuit, for example.

Thus, the processor unit 35 includes a subassembly which is a command generator 40 for generating automatic path-holding modes. This subassembly seeks to issue autopilot commands for holding a path. The command generator 40 for generating automatic path-holding modes represents the autopilot of the system.

Furthermore, the processor unit 35 includes a subassembly which is a human pilot command generator 50. This subassembly issues commands as a function of the action of a human pilot on a control member 20.

The human pilot command generator 50 and the command generator 40 for generating automatic path-holding modes are independent of each other, but they remain functional simultaneously, both in piloted mode and in released mode. The term "piloted" mode refers to a stage in which the pilot is acting on a control member 20 in order to control the path that is followed, while the term "released" mode refers to a stage in which a pilot is not acting on a control member 20.

In addition, the actuator unit 35 includes a path command generator 65. The path command generator 65 is connected to the command generator 40 for generating automatic path-holding modes and to the human pilot command generator 50. Under such circumstances, the path command generator 65 issues path commands as a function of the orders from the autopilot transmitted by the command generator 40 for generating automatic path-holding modes and as a function of orders from the human pilot transmitted by the human pilot command generator 50.

Finally, the processor unit 35 includes a servo-control module 70, e.g. of the usual corrector type. The servo-control module 70 is connected to the path command generator 65 and to at least one or indeed each actuator 10 and to the measurement system 30.

This system serves to control the aircraft as a function of at least one target.

The method applied by this system as shown in the diagram of FIG. 2 thus makes use of the following steps at each computation cycle.

During a step STP1 of generating a first path setpoint, a first path setpoint representing a value to be reached by a first flight parameter is issued. For example, in flight, a pilot operates the interface 250 in order to specify the first path setpoint to be complied with.

Under such circumstances, the command generator 40 for generating automatic path-holding modes performs a step STP2 of automatically generating a first autopilot command. The command generator 40 of automatic path-holding modes acts to prepare a first autopilot command on the basis of the first path setpoint by applying a first predetermined autopilot mathematical model.

The path of the aircraft may be defined by the measurement of the first flight parameter X, together with its successive derivatives $\dot{X}$ and $\ddot{X}$ along the various axes (longitudinal and/or lateral and/or vertical).

Thus, the first autopilot command may comprise at least a first component $\ddot{X}$ coma associated with/attributed to an automatic setpoint value for a second derivative of the first flight parameter, a second component $\dot{X}$ coma associated with/attributed to an automatic setpoint value for a first derivative of the first flight parameter, and a third component Xcoma associated with/attributed to an automatic setpoint value for the first flight parameter.

During a step STP3 of generating a first pilot setpoint, a movement Cpil of a control member is transformed by the human pilot command generator 50 into a first pilot setpoint Xpil, by applying a first piloting model for each target.

During a step STP4 of generating a first human pilot command, the human pilot command generator 50 prepares a first human pilot command on the basis of the first pilot setpoint by applying a predetermined first human piloting mathematical model.

For a first type of interfacing, the first pilot setpoint and the first flight parameter are homogenous in that they are expressed in the same measurement unit and they relate to the same parameter. For a first type of interfacing, the first human pilot command may comprise at least one first component $\ddot{X}$comp associated with/attributed to a human setpoint value for a second derivative of the first flight parameter, a second component $\dot{X}$comp associated with/attributed to a human setpoint value for a first derivative of the first flight parameter, and a third component Xcomp associated with/attributed to a human setpoint value for the first flight parameter.

During a step STP5 of generating a path command, the path command generator 65 prepares the first path command by combining said first autopilot command and said first human pilot command.

For example, when interfacing between a piloting-by-target relationship associated with a command to shift the first flight parameter X and the automatic modes of holding this first flight parameter X, the components of the first autopilot command Xcoma, $\dot{X}$ coma, and $\ddot{X}$coma, are summed respectively with the corresponding components of the first human pilot command Xcomp, $\dot{X}$comp, and $\ddot{X}$comp by summing circuits in order to prepare three components of the first path command Xcom, $\dot{X}$com, and $\ddot{X}$com. With this type of interfacing:

$$Xcom=Xcoma+Xcomp$$

$$\dot{X}com=\dot{X}coma+\dot{X}comp$$

$$\ddot{X}com=\ddot{X}coma+\ddot{X}comp$$

During a command step STP6, the servo-control module 70 generates at least one order to be given to at least one actuator 10 as a function of the current measured values of the components of the first path command, e.g. in order to move an output shaft of the actuator relative to a body of the actuator.

Furthermore, the system may hold a second target in parallel. This second target may be held by applying the first type of interfacing, or by applying a second type of interfacing.

In this second type of interfacing, a second path setpoint Ycons to be satisfied by a second flight parameter is issued during a step of generating a second path setpoint.

Under such circumstances, the command generator 40 for generating automatic path-holding modes performs an automatic step of generating a second autopilot command. The command generator 40 for generating automatic path-holding modes prepares a second autopilot command on the basis of the second path setpoint by applying a second predetermined autopilot mathematical model. The step of automatically generating a second autopilot command may be identical to the above-described step of automatically generating a first autopilot command.

Furthermore, the second autopilot command may comprise at least a first component Ÿcoma associated with/attributed to an automatic setpoint value for a second derivative of the second flight parameter, a second component Ẏcoma associated with/attributed to an automatic setpoint value for a first derivative of the second flight parameter, and a third component Ycoma associated with/attributed to an automatic setpoint value for the second flight parameter.

During a step of generating a second pilot setpoint, a movement of a control member is transformed by the human pilot command generator 50 into a second pilot setpoint Ypil, while applying a second piloting-by-target model.

During a step of generating a second human pilot command, the human pilot command generator 50 prepares a second human pilot command on the basis of the second pilot setpoint by applying a second predetermined human piloting mathematical model.

For a second type of interfacing, the second pilot setpoint and the first derivative of the flight parameter are homogenous, being expressed in the same measurement unit. The second pilot setpoint and the second flight parameter do not deal with the same entity. For the second type of interfacing, the second human pilot command has a third component that is zero, a second component Ẏcomp associated with/attributed to a human setpoint value for a first derivative of the second flight parameter, and a first component Ÿ comp associated with/attributed to a human setpoint value for a second derivative of the second flight parameter.

During a step of generating a path command, the path command generator 65 prepares the path command by combining said second autopilot command and said second human pilot command.

For example, the components of the second autopilot command Ÿcoma and Ẏcoma are summed respectively with the corresponding components of the second human pilot command Ẏcomp and Ÿcomp by summing circuits in order to prepare the components of the path command on a piloting axis, i.e.:

Ycom=∫Ẏcom

Ẏcom=Ẏcoma+Ẏcomp

Ÿcom=Ÿcoma+Ÿcomp

The human pilot command generator 50 thus makes it possible to influence the dynamic behavior of the command generator 40 for generating automatic path-holding modes. The human pilot command generator 50 and the command generator 40 for generating automatic path-holding modes are interconnected, and remain functional simultaneously both in piloted mode and in released mode.

During the command step STP6, the servo-control module 70 generates at least one order to be given to at least one actuator 10 as a function of the current measured values of the components of the path command.

Under such circumstances, a pilot may for example hold two distinct targets in parallel. For example, the first pilot setpoint is established by moving the stick 23 in a direction DIR1 or DIR2 and by using the first type of interfacing. The second pilot setpoint is then established by moving the stick 23 in the other direction and using the second type of interfacing.

Figure 3:
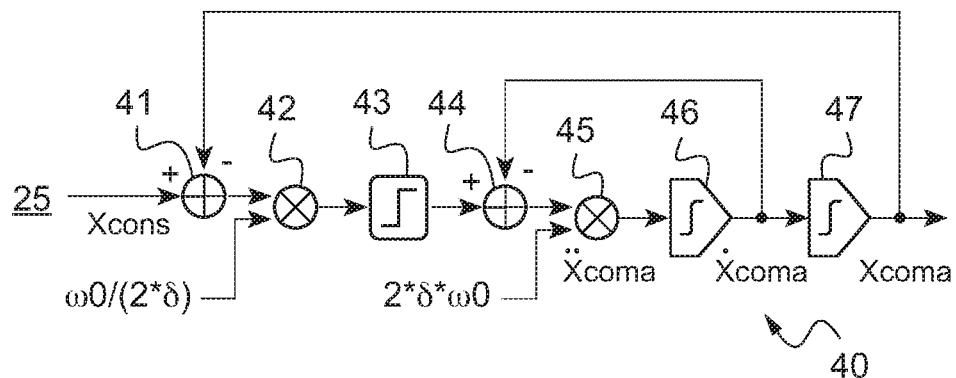
FIG. 3 is a diagram showing a command generator of the processor unit for generating automatic path-holding modes.

FIG. 3 is a detailed example of a command generator 40 for generating automatic path-holding modes. FIG. 3 shows the operation of the command generator 40 for generating automatic path-holding modes that is used in the context of the first type of interfacing. Nevertheless, this same command generator 40 for generating automatic path-holding modes may be used in the context of the second type of interfacing.

This command generator 40 for generating automatic path-holding modes may use a second-order lowpass filter for determining an automatic setpoint value for the second derivative of the flight parameter in question, and may put bounds on this automatic setpoint value. Under such circumstances, the other components of the autopilot command are obtained by integration.

Thus, a subtracter 41 subtracts from the path setpoint Xcons the automatic setpoint value for the flight parameter as calculated at the preceding computation cycle. The result of this difference is multiplied in a multiplier 42 by a constant that is equal to the quotient of the cutoff frequency $\omega 0$ of the filter divided by twice the damping $\delta$ of the filter. The result of this product is bounded by a limiter 43. Under such circumstances, a subtracter 44 subtracts from the bounded product the automatic setpoint value for the first derivative of the flight parameter in question as determined at the preceding computation cycle. The automatic setpoint value for the second derivative of the first path command is then supplied in a multiplier 45 which multiplies the result of the difference by twice the product of the cutoff frequency $\omega 0$ multiplied by the damping $\delta$.

A first integrator 46 serves to deduce therefrom the automatic setpoint value for the first derivative of the flight parameter in question, and a second integrator 47 serves to deduce therefrom the value of the automatic setpoint for the flight parameter in question.

Under such circumstances, the third component of the autopilot command is then equal to the automatic setpoint value for the flight parameter. The second component of the autopilot command is equal to the automatic setpoint value for the first derivative of the flight parameter. The first component of the autopilot command is equal to the automatic setpoint value for the second derivative of the flight parameter.

Figure 4:
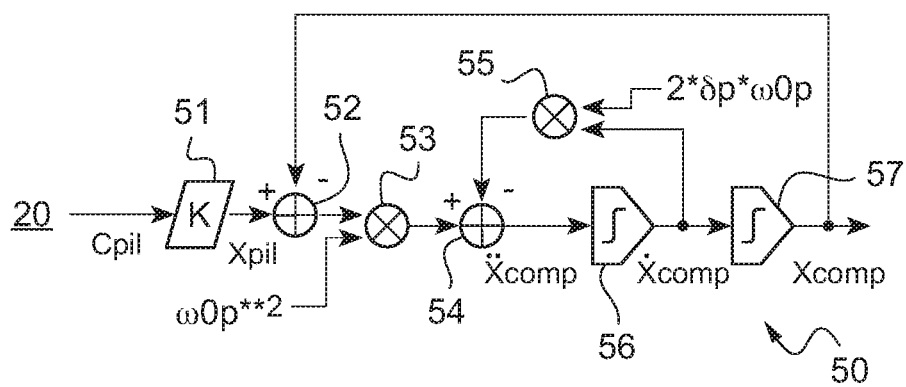
FIGS. 4 and 6 are diagrams showing human pilot command generators of the processor unit.

FIG. 4 shows an example of human pilot command generator 50 enabling the control member to impart controlled offsets directly to the flight parameters on one or more axes via a first type of interfacing.

To do this, a movement Cpil of the control member may represent a measurement of the deflection that the pilot imparts to the control member. This movement Cpil is converted into a pilot setpoint Xpil via a piloting-by-target model 51.

In similar manner to the automatic holding mode, the human pilot command generator 50 prepares the components of a first human pilot command Xcomp, Ẋcomp, and Ẍcomp from the pilot setpoint Xpil via a second order filter.

Thus, a subtracter 52 subtracts from the pilot setpoint Xpil the human setpoint value for the first flight parameter as calculated during the preceding computation cycle. The result of this difference is multiplied in a multiplier 53 by a constant equal to the square of the cutoff frequency $\omega 0p$ of the filter in order to obtain a first product. In parallel, a multiplier 55 determines a second product by multiplying twice the product of the cutoff frequency $\omega 0p$ and the damping $\delta p$ of the filter by the human setpoint value for the first derivative of the first flight parameter as determined during the preceding computation cycle. Under such circumstances, a subtracter 54 subtracts the second product from the first product in order to obtain the setpoint value for the second derivative of the first command.

A second integrator 56 serves to deduce therefrom the human setpoint value for the first derivative of the first flight parameter, and a third integrator 57 serves to deduce therefrom the human setpoint value for the first flight parameter.

Under such circumstances, the third component of the human pilot command is then equal to the human setpoint value for the flight parameter. The second component of the human pilot command is equal to the human setpoint value for the derivative of the flight parameter. The first component of the human pilot command is equal to the human setpoint value for the second derivative of the flight parameter.

Figure 5:
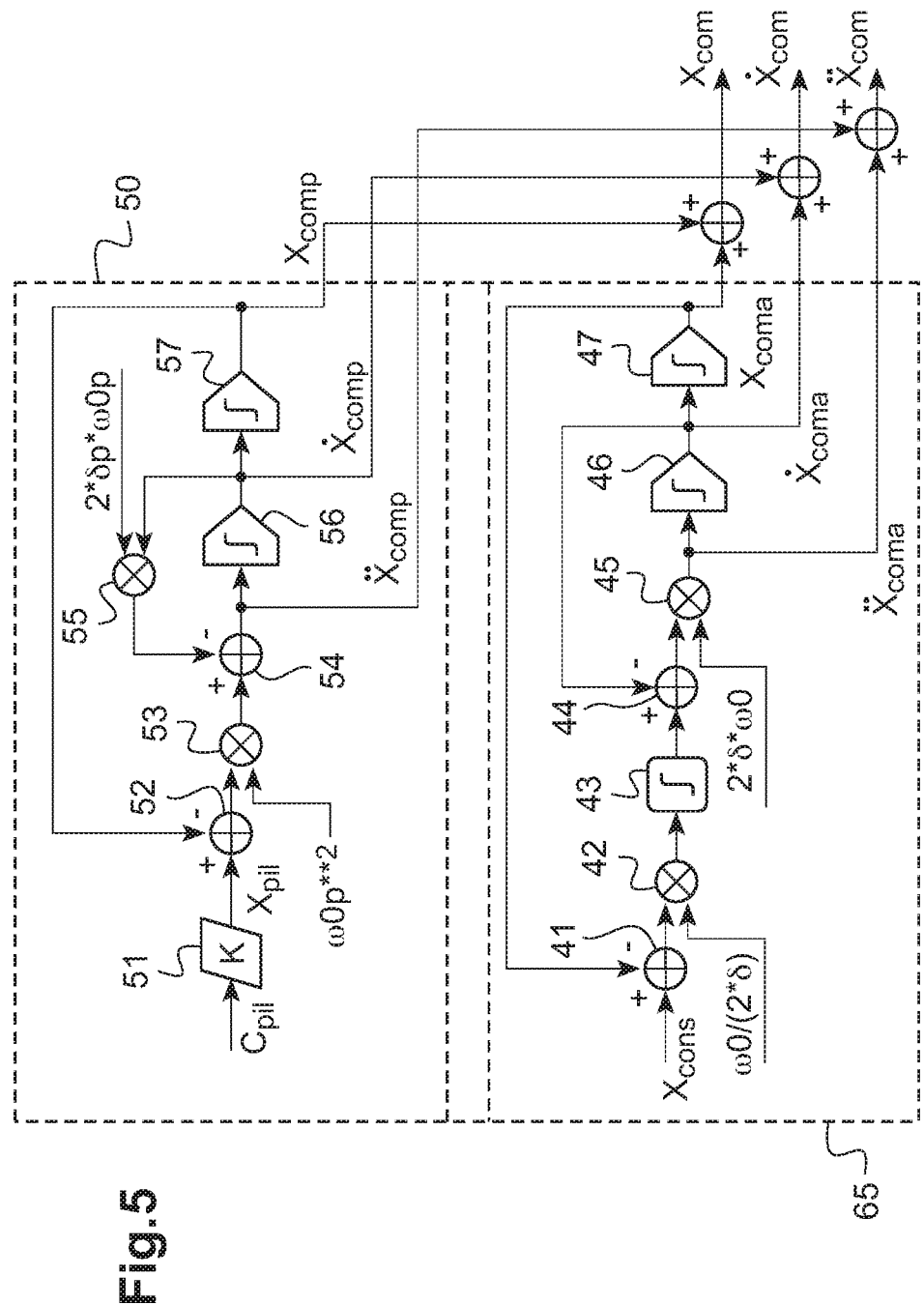
FIGS. 5 and 7 are diagrams showing interfaces.

FIG. 5 shows interfacing between a relationship for piloting by target associated with a command for shifting the first flight parameter X and with automatic modes for holding this first flight parameter X. The components of the first autopilot command Xcoma, Ẋcoma, and Ẍcoma, are summed respectively with the corresponding components of the first human pilot command Xcomp, comp, and Ẍcomp by means of summing circuits in order to prepare three components for the path command Xcom, Ẋcom, and Ẍcom.

Figure 6:
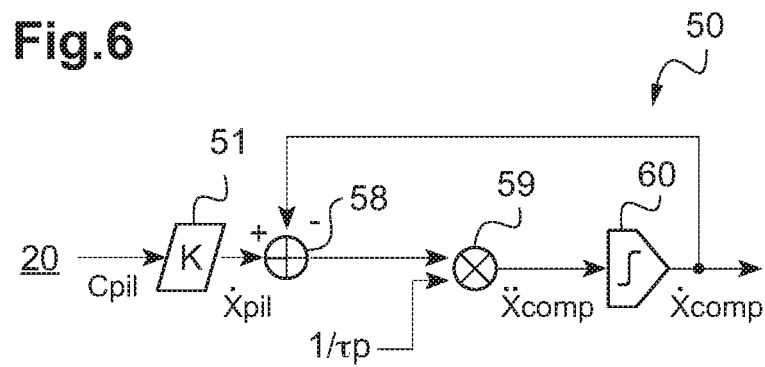

FIG. 6 shows an example of a human pilot command generator 50 enabling the control member 20 to control directly the first derivative of the controlled flight parameter on one or more axes in compliance with a second piloting target relating to a second flight parameter via a second type of interfacing.

For this purpose, a movement Cpil of a control member may represent a measurement of the deflection that the pilot imparts to the control member. This movement Cpil is converted into a pilot setpoint Ẋpil via a piloting-by-target model 51.

A subtracter 58 subtracts from the pilot setpoint Ẋpil the human setpoint value for the first derivative of the second flight parameter from the preceding computation cycle. The result of this difference is multiplied in a multiplier 59 by a constant equal to the reciprocal of the predetermined time constant of the filter in order to obtain the human setpoint value for the second derivative of the second flight parameter. An integrator 60 serves to deduce therefrom the human setpoint value for the first derivative of the second flight parameter.

Under such circumstances, the first component of the human pilot command is zero. The second component of the human pilot command is equal to the value of the human setpoint for the first derivative of the second flight parameter. The first component of the human pilot command is equal to the value of the human setpoint for the second derivative of the second command.

Figure 7:
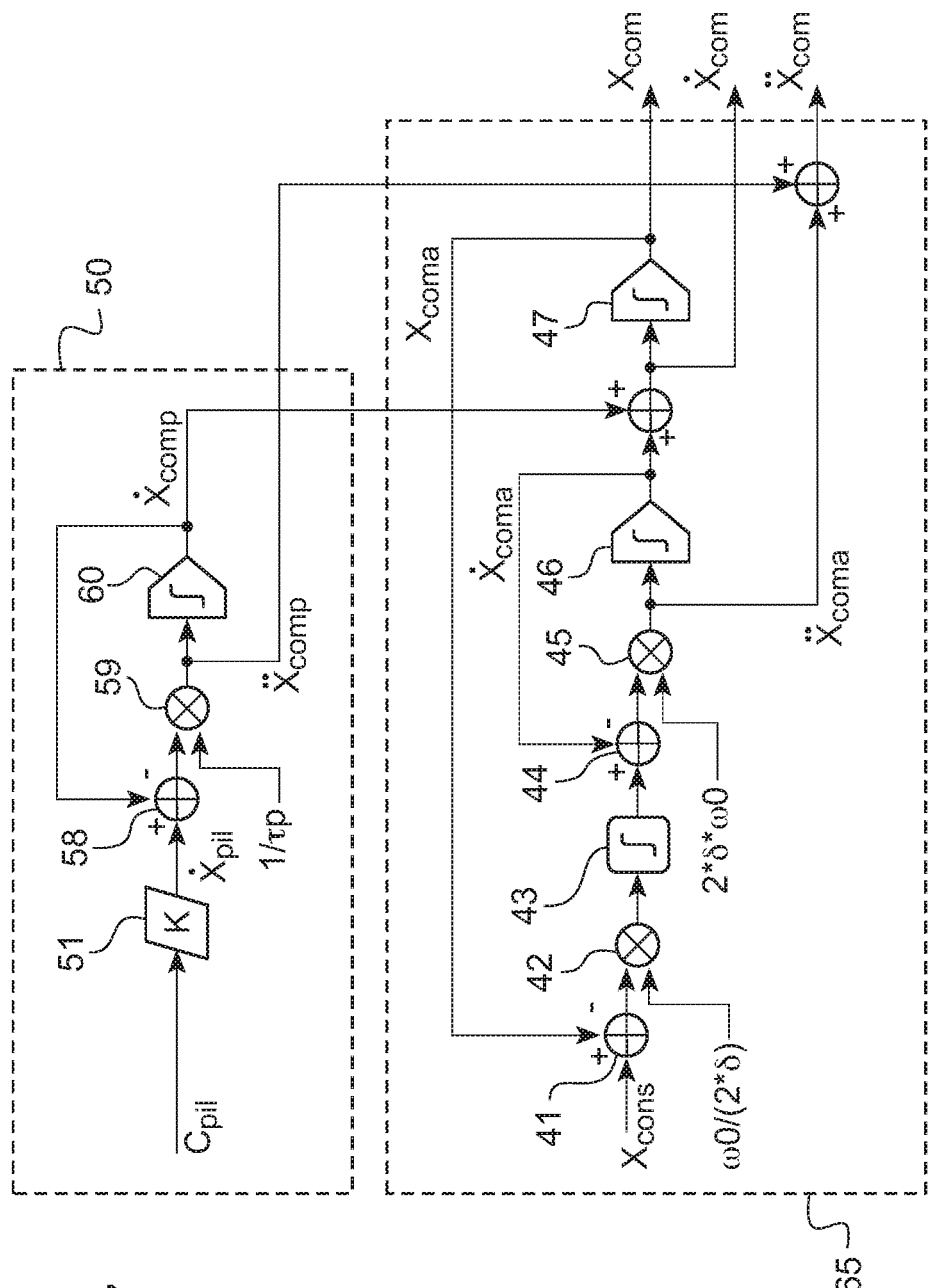

FIG. 7 shows an example of second interfacing. The components of the second autopilot command Ẋcoma and Ẍcoma are summed respectively with the corresponding components of the second human pilot command Ẋcomp and Ẍcomp by means of summing circuits in order to prepare a second component Ẋcom and a first component Ẍcom of the path command on a piloting axis. A third component Xcom is obtained by integrating the second component Ẋcom of the path command.

FIGS. 8 to 11 serve to illustrate the invention on the basis of an example. In this example, a higher mode is engaged in order to facilitate the final stage of an approach during which the aircraft 1 is decelerated until reaching a ground speed setpoint that is sufficiently low in the vicinity of the landing point, so as subsequently to move to the landing point at a slow speed under good operational conditions. The higher mode that is engaged serves to acquire a longitudinal ground speed setpoint Vxcom, e.g. 40 kt and a lateral ground speed setpoint of zero by applying cyclical control to the pitch of the blades of the main rotor.

Figure 8:
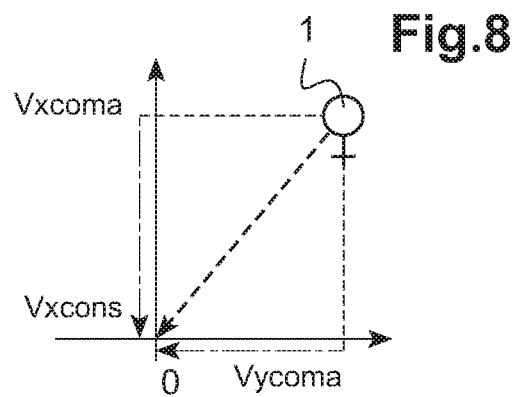
FIGS. 8 to 11 are diagrams showing examples of the invention in use.
Figure 9:
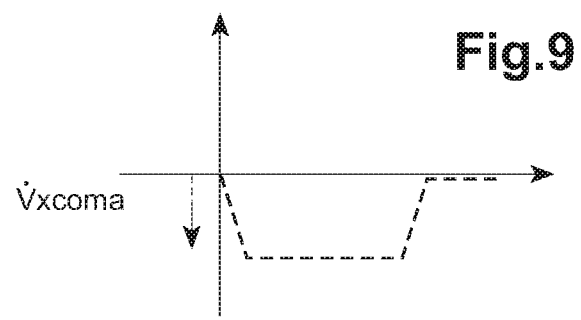

FIG. 8 shows the required speed variations, and FIG. 9 shows the deceleration that enables these speed variations to be obtained.

On the lateral axis, it may be advantageous to shift the approach axis laterally while decelerating in order to steer the rotorcraft accurately towards the landing point, while continuing to decelerate. For this purpose, a command by target generator of the translational rate command (TRC) type is applied to the lateral axis of the aircraft and is interfaced with the automatic mode for engaging hovering flight.

On the longitudinal axis, it may be advantageous to be able to vary the automatic deceleration rate, in particular to manage the deceleration distance. For this purpose, a command by target generator of the acceleration command (ACC) type is applied to the longitudinal axis of the aircraft and interfaced with the automatic mode for engaging hovering flight.

Under such circumstances, the method can enable a lateral speed target to be held via the first type of interfacing, while leaving a pilot the possibility of acting on this lateral speed, e.g. by moving the stick 23 laterally.

Figure 10:
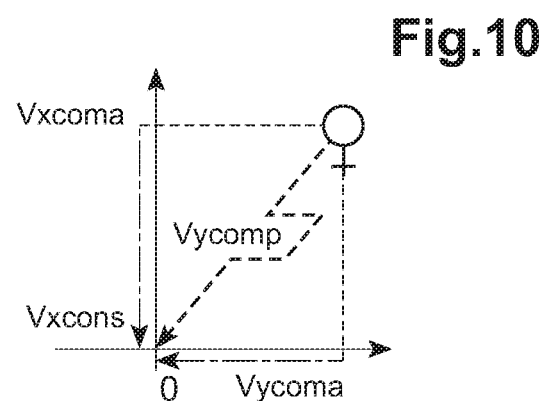

With reference to FIG. 10, moving the stick from left to right and vice versa causes a first human pilot command to be created that is combined with a first autopilot command. The first human pilot command depends on the movement of the stick, while the first autopilot command depends on the first lateral speed path setpoint, which is zero. The method thus makes it possible to shift the value of the lateral speed without altering the dynamics of bringing this lateral speed to zero.

The method can make it possible also to hold a longitudinal speed target via a second type of interfacing, by leaving a pilot the possibility of acting on the first derivative of the longitudinal speed, e.g. by moving the stick 23 longitudinally.

Figure 11:
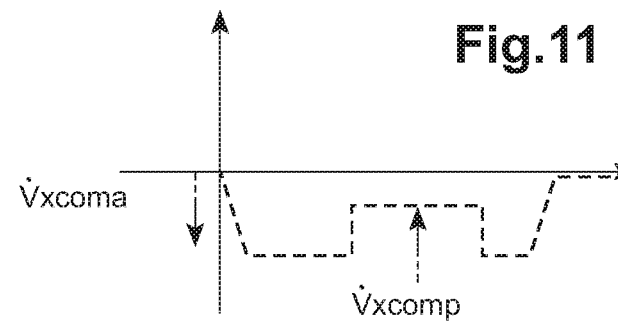

With reference to FIG. 11, moving the stick longitudinally gives rise to the creation of a second human pilot command combined with a second autopilot command. The second human pilot command depends on the movement of the stick, while the second autopilot command depends on the second longitudinal speed path setpoint, which is at 40 kt. The method makes it possible to manage the dynamic behavior of the longitudinal speed setpoint in automatic holding mode.

Naturally, the present invention may be subjected to numerous variations as to its implementation. Although several embodiments are described, it will readily be understood that it is not conceivable to identify exhaustively all possible embodiments. It is naturally possible to envisage replacing any of the means described by equivalent means without going beyond the ambit of the present invention.

What is claimed is:

1. A method of implementing a flight control system for controlling a path of a rotorcraft, the rotorcraft having a movable aerodynamic maneuvering member to control the movement of the rotorcraft, the rotorcraft having an actuator to move the maneuvering member, the flight control system having a flight control member movable by a human pilot, and wherein on each iteration and for interfacing the following steps are performed:

generating a path setpoint representing a value to be reached by a flight parameter;

automatically generating an autopilot command from the path setpoint by applying a predetermined autopilot mathematical model;

generating a pilot setpoint, during which a movement of the control member is transformed by a piloting-by-target model into the pilot setpoint, the pilot setpoint and the flight parameter being homogenous in that the pilot setpoint is expressed in the same measurement unit as the flight parameter;

generating a human pilot command from the pilot setpoint by applying a predetermined human piloting mathematical model;

generating a path command by combining the autopilot command and the human pilot command; and controlling the actuator, during which an order is transmitted to the actuator, the order being determined by a servo-control module from the first path command and a current value of the flight parameter.

2. The method according to claim 1, wherein the path setpoint is set by a human pilot.

3. The method according to claim 1, wherein:

the autopilot command comprises at least a first component associated with a second derivative of the flight parameter, a second component associated with a first derivative of the flight parameter, and a third component associated with the flight parameter;

the human pilot command comprises at least a first component associated with a second derivative of the flight parameter, a second component associated with a first derivative of the flight parameter, and a third component associated with the flight parameter;

the path command comprises a first component combining the first component of the autopilot command and the first component of the human pilot command, a second component combining the second component of the autopilot command and the second component of the human pilot command; and a third component combining the third component of the autopilot command and the third component of the human pilot command; and the order being determined by the servo-control module on the basis of the first path command and a current value of the flight parameter, a current value of the first derivative of the flight parameter, and a current value of the second derivative of the flight parameter.

4. The method according to claim 1, wherein automatically generating an autopilot command comprises the following steps:

transforming the path setpoint into an automatic setpoint value for a second derivative of the flight parameter by applying the autopilot mathematical model, a first component of the autopilot command being represented by this automatic setpoint value for a second derivative of the first flight parameter;

establishing an automatic setpoint value for a first derivative of the first flight parameter by integrating the automatic setpoint value for a second derivative of the first flight parameter, a second component of the first autopilot command being represented by this automatic setpoint value for a first derivative of the first flight parameter; and establishing an automatic setpoint value for the first flight parameter by integrating the automatic setpoint value for a first derivative of the first flight parameter, a third component of the first autopilot command being represented by this automatic setpoint value for the first flight parameter.

5. The method according to claim 4, wherein transforming the path setpoint into an automatic setpoint value for a second derivative of the flight parameter is performed by applying a second-order lowpass filter.

6. The method according to claim 5, wherein automatically generating an autopilot command includes bounding the automatic setpoint value for a second derivative of the flight parameter.

7. The method according to claim 1, wherein generating a human pilot command comprises the following steps:

transforming the pilot setpoint into a human setpoint value for a second derivative of the flight parameter, a first component of the human pilot command being represented by this human setpoint value for a second derivative of the flight parameter;

establishing a human setpoint value for a first derivative of the flight parameter by integrating the human setpoint value for a second derivative of the flight parameter, a second component of the human pilot command being represented by this human setpoint value for a first derivative of the flight parameter; and establishing a human setpoint value for the flight parameter by integrating the human setpoint value for a first derivative of the flight parameter, a third component of the human pilot command being represented by this human setpoint value for the flight parameter.

8. The method according to claim 7, wherein transforming the pilot setpoint into a human setpoint value for a second derivative of the flight parameter is performed by applying a second-order lowpass filter.

9. A rotorcraft having a flight control system for controlling a path of the rotorcraft, the rotorcraft having an aerodynamic maneuvering member that is movable to control a movement of the rotorcraft, the rotorcraft including an actuator for moving the maneuvering member, the flight control system including a flight control member movable by a human pilot, wherein the rotorcraft implements the method according to claim 1, the rotorcraft including:

a setpoint generator performing the step of generating a first path setpoint;

a command generator for generating automatic path-holding modes that implements the step of automatically generating a first autopilot command;

a human pilot command generator that implements the step of generating a first pilot setpoint and the step of generating a first human pilot command;

a path command generator connected to the command generator for generating automatic path-holding modes and to the human pilot command generator, the path command generator implementing the step of generating a path command; and a servo-control module connected to the path command generator and to the actuator and to one sensor measuring data relating to a path to be followed, the sensor comprising a sensor measuring a current value of the first flight parameter, the servo-control module implementing the command step.

10. A method of implementing a flight control system for controlling a path of a rotorcraft, the rotorcraft having at least one movable aerodynamic maneuvering member for controlling the movement of the rotorcraft, the rotorcraft having at least one actuator for moving the maneuvering member, the flight control system having a flight control member movable by a human pilot, and wherein on each iteration and for at least first type of interfacing, the method comprises:
- a step of generating a first path setpoint, the first path setpoint representing a value to be reached by a first flight parameter;
- a step of automatically generating a first automatic pilot command from the first path setpoint by applying a first predetermined autopilot mathematical model;
- a step of generating a first pilot setpoint during which a movement of the control member is transformed by a first piloting-by-target model into the first pilot setpoint, the first pilot setpoint and a first derivative of the first flight parameter being homogenous in that the first pilot setpoint is expressed in the same measurement unit as the first derivative of the first flight parameter;
- a step of generating a first human pilot command from the first pilot setpoint by applying a first predetermined human piloting mathematical model;
- a step of generating a first path command by combining the first autopilot command and the first human pilot command; and
- a control step for controlling the at least one actuator during which at least one order is transmitted to the at least one actuator, the order being determined by the servo-control module on the basis of at least the first path command and of at least one current value of the first flight parameter.

11. The method according to claim 10, wherein the step of generating a first human pilot command comprises the following steps:
- transforming the first pilot setpoint into a human setpoint value for a second derivative of the first flight parameter, a first component of the first human pilot command being represented by this human setpoint value for a second derivative of the first flight parameter; and
- establishing a human setpoint value for a first derivative of the first flight parameter by integrating the human setpoint value for a second derivative of the first flight parameter, a second component of the first human pilot command being represented by this human setpoint value for a first derivative of the first flight parameter.

12. The method according to claim 11, wherein the step of transforming the first pilot setpoint into a human setpoint value for a second derivative of the first flight parameter is performed by applying a first-order lowpass filter.

13. The method according to claim 10, wherein the rotorcraft includes a stick movable in a longitudinal direction from front to rear and from rear to front, the stick being movable in a transverse direction from left to right and from right to left, and the first pilot setpoint is established by moving the stick along one of the longitudinal and transverse directions.

14. A method of implementing a flight control system for controlling a path of a rotorcraft, the rotorcraft having a movable aerodynamic maneuvering member to control the movement of the rotorcraft, the rotorcraft having an actuator to move the maneuvering member, the flight control system having a flight control member movable by a human pilot, and wherein on each iteration and for interfacing, the method comprises:
- generating a path setpoint, the path setpoint representing a value to be reached by a flight parameter;
- automatically generating an automatic pilot command from the path setpoint by applying a predetermined autopilot mathematical model;
- generating a pilot setpoint during which a movement of the control member is transformed by a piloting-by-target model into the pilot setpoint, the pilot setpoint and a first derivative of the flight parameter being homogenous in that the pilot setpoint is expressed in the same measurement unit as the first derivative of the flight parameter;
- generating a human pilot command from the pilot setpoint by applying a predetermined human piloting mathematical model;
- generating a path command by combining the autopilot command and the human pilot command; and
- controlling the actuator during which an order is transmitted to the actuator, the order being determined by the servo-control module on the basis of the path command and of one current value of the flight parameter.

15. The method according to claim 14, wherein the step of generating a human pilot command comprises the following steps:
- transforming the pilot setpoint into a human setpoint value for a first derivative of the flight parameter, a first component of the human pilot command being represented by this human setpoint value for a second derivative of the flight parameter; and
- establishing a human setpoint value for a first derivative of the flight parameter by integrating the human setpoint value for a second derivative of the flight parameter, a second component of the human pilot command being represented by this human setpoint value for a first derivative of the flight parameter.

16. The method according to claim 15, wherein the step of transforming the pilot setpoint into a human setpoint value for a second derivative of the flight parameter is performed by applying a first-order lowpass filter.

17. The method according to claim 14, wherein the rotorcraft includes a stick movable in a longitudinal direction from front to rear and from rear to front, the stick being movable in a transverse direction from left to right and from right to left, and the pilot setpoint is established by moving the stick along one of the longitudinal and transverse directions.

* * * * *